United States Patent [19]

Winner

[11] Patent Number: 4,487,861
[45] Date of Patent: Dec. 11, 1984

[54] AQUEOUS POLYMERIC BLENDS

[75] Inventor: Peter P. Winner, North Royalton, Ohio

[73] Assignee: SCM Corporation, New York, N.Y.

[21] Appl. No.: 555,354

[22] Filed: Nov. 28, 1983

[51] Int. Cl.$^3$ .......................... C09D 5/02; C08L 63/00
[52] U.S. Cl. ..................... 523/428; 523/100; 523/403; 523/404; 523/407; 523/427
[58] Field of Search ............... 523/100, 403, 404, 407, 523/427, 428

[56] References Cited

U.S. PATENT DOCUMENTS

| | | | |
|---|---|---|---|
| 3,686,371 | 8/1972 | Hasegawa | 260/980 |
| 4,059,550 | 11/1977 | Shimp | 523/404 |
| 4,073,762 | 2/1978 | Hosoda et al. | 523/403 |
| 4,111,870 | 9/1978 | Den Hartog et al. | 523/428 |
| 4,113,684 | 9/1978 | Petrie | 523/404 |
| 4,132,692 | 1/1979 | Görlitz et al. | 523/403 |
| 4,164,487 | 8/1979 | Martin | 523/404 |
| 4,169,187 | 9/1979 | Glazar | 523/428 |
| 4,212,781 | 7/1980 | Evans et al. | 523/403 |
| 4,289,811 | 9/1981 | Shelley | 525/246 |
| 4,289,812 | 9/1981 | Martin | 523/402 |
| 4,304,694 | 12/1981 | Scola et al. | 523/428 |
| 4,316,922 | 2/1982 | Perine et al. | 523/417 |
| 4,397,970 | 8/1983 | Campbell et al. | 523/403 |

*Primary Examiner*—Ronald W. Griffin
*Attorney, Agent, or Firm*—Thomas M. Schmitz

[57] ABSTRACT

A polymeric composition useful for interior coatings for beverage containers comprises a polymeric mixture of epoxy-acrylic copolymer and epoxy phosphate ester.

8 Claims, No Drawings

AQUEOUS POLYMERIC BLENDS

BACKGROUND OF THE INVENTION

This invention relates to water dispersed polymeric compositions and processes particularly useful in surface coating compositions, and more particularly pertains to aqueous polymeric blends of certain water dispersed epoxy-acrylic copolymers and epoxy phosphate ester. The polymeric blend is especially useful as a binder system for can coating compositions for the interior of steel cans used as food and beverage containers and similar sanitary coating applications.

Epoxy resins are particularly desirable for use in surface coating materials as a vehicle or polymeric binder for pigments, fillers, and other additives whereby epoxy resins advantageously provide toughness, flexibility, adhesion, and chemical resistance and water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable monomer in the presence of at least 3% by weight of benzoyl peroxide (or the free radical initiating equivalent thereof) based on monomer at a suitable reaction temperature. This reaction produces a reaction mixture containing an in-situ formed blend of resinous materials comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. In a preferred embodiment of U.S. Pat. No. 4,212,781, a polyglycidyl ether of bisphenol-A is reacted with a mixture of addition polymerizable monomers containing an acrylic acid such as methacrylic acid. The epoxy resin has a molecular weight above 4,000 and provides from 50% to 90% of the initial reaction mixture. The reaction takes place in the presence of benzoyl peroxide at an elevated temperature above 80° C. and preferably between about 110° C. and 130° C. to effect addition polymerization of the monomer and product addition polymer grafted to the epoxy resin. The reaction product can be dispersed in a basic aqueous medium to form a water-reducible epoxy-acrylic copolymer mixture.

Epoxy phosphates are shown as additives to coating compositions in U.S. Pat. No. 3,686,371 and U.S. Pat. No. 4,059,550. Epoxy phosphates are disclosed as the essential binder component in U.S. Pat. No. 4,289,812, U.S. Pat. No. 4,316,922, U.S. Pat. No. 4,397,970 and U.S. Pat. No. 4,164,487.

It now has been found that certain aqueous blends of epoxy-acrylic copolymer and epoxy phosphate ester provide an excellent polymeric binder composition suitable for use as an interior coating for beverage and food containers, and especially useful for steel cans. In the beverage industry, soft drinks containing acid ingredients are particularly harsh on coatings for interiors for can, especially steel cans. Steel cans containing soft drinks are inadequately protected by either the epoxy-acrylic copolymer alone or the epoxy phosphate alone. Unexpectedly, the epoxy-acrylic copolymer in combination with epoxy phosphate ester advantageously provides improved corrosion resistance to steel cans when applied to the interior surface and subsequently used for containing acidic soft drinks. Improved solvent resistance and additional favorable characteristics of the coating composition. These and other advantages will become more apparent by referring to the detailed description of the invention and the accompanying illustrative examples.

SUMMARY OF THE INVENTION

Briefly, the corrosion resistant coating composition of this comprises a binder system based on aqueous polymeric blend containing by weight between 20% and 80% epoxy-acrylic copolymer and 20%, and 80% epoxy phosphate ester.

DETAILED DESCRIPTION OF THE INVENTION

The polymeric composition is based on an aqueous blend of epoxy-acrylic copolymer and epoxy phosphate ester.

Referring first to the epoxy-acrylic copolymer, the epoxy-acrylic copolymer is a graft copolymer comprising epoxy resin coreacted with monomers including acrylic monomers to produce an epoxy-acrylic graft copolymer. The preferred epoxy-acrylic copolymer comprises an epoxy-acrylic graft copolymer containing epoxy resin, epoxy-acrylic graft copolymer, and ungrafted addition polymer produced by polymerizing ethylenically unsaturated monomers in-situ with epoxy resin in the presence of a benzoyl peroxide (or equivalent) as more particularly set forth in U.S. Pat. No. 4,212,781, and said patent is incorporated herein by reference. The in-situ polymerization of monomers generally comprises reacting the ethylenically unsaturated monomers in the presence of epoxy with at least 3% of benzoyl peroxide by weight of the monomer. The in-situ formed carboxyl-functional polymer can have a molecular weight between 5,000 and 20,000 and preferably between 7,000 and 15,000. The carboxyl content (—COOH) should comprise at least 2% by weight of the monomer mixture and preferably should be above 5%.

The acrylic portion of the epoxy-acrylic copolymer comprises polymerized ethylenically unsaturated monomers which include carboxyl functional monomers such as acrylic acid and lower alkyl substituted acrylic acids such as methacrylic or ethacrylic acid to provide carboxyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are ethylenically unsaturated copolymerizable monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful ethylenic monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful ethylenic monomers are those readily commercial available monomers having vinyl unsaturation and include styrenic monomers such as styrene, vinyl toluene, divinyl benzene, isoprene and butadiene.

The epoxy resin portion of the epoxy-acrylic copolymer mixture can be either aliphatic or aromatic, although the aromatic epoxy resins are preferred. The most preferred epoxy resins are polygylcidyl ethers of bisphenol-A, especially those having 1,2-epoxy equivalency of from about 1.3 to about 2. The molecular weight should be from about 350 to about 20,000, and preferably, for sanitary coating compositions, from about 4,000 to about 10,000. Mixtures of monoepoxides and diepoxides are desirable. Another procedural variation is the introduction of the aromatic polyether which is devoid of oxirane functionality by reacting epoxide groups with benzoic acid, phenol or similar monoreactive epoxide blocking agent. In preferred practice, the epoxy resin is a mixture including aromatic polyether devoid of oxirane functionality, aromatic polyether having a single oxirane group, and aromatic polyether having two oxirane groups. This mixture of epoxy functionality maximizes compatability, although the aromatic polyether devoid of oxirane functionality can be added later, and the mixture can be heated and agitated to enhance the intimacy of the association between the various components.

The preferred epoxy-acrylic copolymer is a graft copolymer prepared by in-situ polymerization of the ethylenic monomers with epoxy resin. The epoxy resin can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such as xylene, benzene, ethyl benzene, toluene, and the alkoxy alkanols. For the monomers, alcohols such as methanol, ethanol, propanol, butanol, and the like, are suitable, with butanol being preferred. Ethylene glycol monobutyl ether, ethylene glycol monobutyl ether acetate, and the like, hexane, mineral spirits, and the like are also suitable. For subsequent dispersion into water, then the solvents selected should be water-soluble materials, such as acetone, butanol, ethanol, propanol, ethylene glycol monoethyl ether, and the like. Ordinarily the amount of solvent may be in the range from about 5% to 30% by weight of the sum of the other components. In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauroyl peroxide, methyl ethyl ketone peroxide, chlorobenzoyl peroxide, and the like. Benzoyl peroxide is preferred as the free radical initiator for use in the practice of the present invention. The amount of free radical catalyst is expressed in terms of percentage by weight of benzoyl peroxide based on the total weight of the polymerizable monomer, or equivalent, at the temperature of use. The amount of catalyst should be at least 3%, and preferably more than 4% by weight of benzoyl peroxide or equivalent based on monomer weight. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected. After the monomers are added, the reaction mixture is normally held for up to three hours at the reaction temperature to complete the monomer conversion. The in-situ polymerization of the monomers produces an in-situ formed carboxyl functional polymer containing at least about 20% of polymerized monoethylenically unsaturated carboxylic acid monomer based on the total weight of monomers as well as epoxy-acrylic graft polymer and ungrafted epoxy resin, as more particularly set forth in U.S. Pat. No. 4,212,781.

The epoxy-acrylic copolymer also can be an epoxy-acrylic ester graft copolymer produced from previously described epoxy resin and carboxylic addition polymer comprising copolymerized monomers including carboxyl monomers. The epoxy-acrylic ester graft copolymer comprises acidic or carboxylic addition copolymer esterified with epoxy resin. The epoxy-acrylic ester graft copolymer can be produced by esterifying the solvent-soluble carboxy functional polymer with an epoxy resin wherein the esterification reaction is carried out preferably in an organic solvent and in the presence of sufficiently high amounts of amine catalyst to produce a nongelled epoxy ester graft copolymer. The esterification reaction is carried out in the presence of amine catalyst in sufficient amounts greater than catalyic amounts of 0.3% to avoid gellation and preferably in the presence of greater than 2% amine esterification catalyst based on the weight of reactants subjected to esterification to produce an epoxy-acrylic ester graft copolymer. The preformed acrylic polymer preferably comprises copolymerized ethylenically unsaturated monomers including at least about 20% by weight of copolymerized monoethylenically unsaturated carboxylic acid monomer based on the total weight of copolymer to produce a carboxyl functional prepolymer. The epoxy resin portion comprises at least about 40% of the epoxy acrylic ester polymer and provides an oxirane functionality in a stoichiometric deficiency with respect to carboxyl functionality in the carboxyl preformed polymer in a ratio of about 1:2 to 1:20 whereby the excess carboxyl functionality in the epoxy-acrylic ester provides a means for dispersing the polymer into water by reacting with a base to render the reaction product self-emulsifiable into water, as further described in detail in copending application Ser. No. 222,933 filed Jan. 6, 1981 and EPO publication Ser. No. 0 006 334 published Jan. 9, 1980. Still a further variation of the epoxy-acrylic graft copolymer can comprise forming a preformed carboxylic polymer of polymerized ethylenic monomers including carboxyl monomers in the presence of melamine resin followed by reacting the preformed carboxylic polymer with epoxy resin in the presence of high amounts of amine as suggested in U.S. Pat. No. 4,289,811 to form an epoxy-acrylic ester graft copolymer.

Referring next to the epoxy phosphate ester, the preferred epoxy phosphate ester polymer comprises epoxy resin coreacted with phosphoric acid to produce a phosphated epoxy ester polymer. The phosphated epoxy polymer contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide polymer can contain up to about 1 mole of phosphate whereas a mole of a diepoxide polymer can contain up to 2 moles of phosphate. On a weight basis, the phosphated epoxy polymer contains between about 0.05% and 5%, and preferably between 0.1% and 3% coreacted phosphoric acid, although excess molar amounts of phosphate reactant in any appreciable amount is undesirable. The epoxy polymer used for preparing the phosphated epoxide can be epoxy polymers having a molecular weight greater than 200 and up to about 10,000 and preferably between about 400 and 8,000. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. Monoepoxides such as phenyl glycidyl ether are suitable although diepoxides are preferred. The preferred epoxy polymers are produced by coreacting epichlorohydrin or dichlorohydrin with bisphenol-A to provide linear epoxy polymers having pendant epoxide groups. The most preferred epoxy polymers are epichlorohydrin reacted with bisphenol-A. The epoxy polymer can contain between 2 and 25 monomer units and preferably between 3 and 20 copolymerized monomer units (bisphenol-A) wherein the epoxy polymer can be either a mono or diepoxide polymer. The phosphated epoxide polymer can be synthesized by heating a solution of epoxy resin dispersed in a suitable solvent such as methyl ethyl ketone or 2-butoxy ethanol and then reacted with phosphoric acid or preferably polyphosphoric acid at reflux temperatures of 120° C. to 145° C. for sufficient time, typically 2 to 5 hours, to completely react the phosphoric acid with available epoxide groups. The preparation of epoxy phosphate resins are shown in U.S. Pat. No. 4,289,812 and U.S. Pat. No. 4,316,922. The epoxy phosphate can be prepared from a single epoxy resin or from a mixture of epoxy resins. In a further variation of this aspect of the invention, the epxoy phosphate polymer can be produced by reacting a non-phosphated epoxy resin with an epoxy resin containing higher levels of phosphate, provided that the resulting epoxy resin mixture contains between about 0.05% and 5% by weight coreacted phosphoric acid. For instance, a weight ratio of 9 parts non-phosphated epoxy resin mixed with 1 part phosphated (10%) epoxy resin coreacted together at temperatures above 120° C. for at least 2 hours provides a phosphated epoxy polymer containing 1% coreacted phosphoric acid in accordance with this invention. In practice, the non-phosphated epoxy resin is reacted with phosphated (10%) epoxy resin at sufficiently high temperatures for time sufficient to convert the mixture to predominately a monophosphate, which can be enhanced by the addition of 2% water based on solids to hydrolyze the phosphated mixture and preferably convert the mixture to a pedominately monophosphated epoxy resin. The phosphated epoxy polymer containing between 0.05% and 5% coreacted phosphoric acid in accordance with this invention then can be dispersed into an amine and water mixture by mechanical mixing. The resulting aqueous dispersed epoxy phosphate can be added to the epoxy-acrylic copolymer and the self-curing water dispersed polymer in accordance with this invention.

The highly desirable corrosion resistant coating composition of this invention and especially useful for steel can is based on an aqueous blend of polymers comprising by weight between 20% and 80% epoxy-acrylic copolymer and between 20% and 80% epoxy phosphate ester, and preferably between 35% and 65% epoxy-acrylic copolymer and between 35% and 65% epoxy phosphate ester. The foregoing matrix polymer compositions are then mixed with a water-dispersed cross-linking component generally referred to as aminoplast resins adapted to heat cure and cross link with the carboxyl functionality of the epoxy-acrylic copolymer mixture. On a polymer weight basis, the coating composition contains between 0% and 15% but preferably between 1% and 10% aminoplast cross-linking resin mixed with between 85% and 100% of the above-indicated matrix polymer compositions.

Referring next to the aminoplast cross-linking resins, aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 303), and Beetle 80 (products of American Cyanamid which are methylated or butylated ureas.) Other suitable aminoplast resins are of the type produced by the reaction or aldehyde and formal guanamines; ammeline; 2-chloro-4,6-diamine-1,3,5-triazine; 2-phenyl-p-oxy-4,6-diamino-1,3,5-tri-azine; and 2,4,6-triethyl-triamino-1,3,5-triazine. The mono, di-, or tri-aryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

The water-dispersed coating compositions can be produced by mixing together the various water-dispersed polymers. The aminoplast polymer can be dispersed into water by mechanical mixing. The epoxy-acrylic copolymer and phosphate polymer are prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like, as more particularly described in U.S. Pat. No. 4,212,781. The amount of water contained in the coating composition containing the epoxy-acrylic copolymer, and the epoxy phosphate polymer, and the aminoplast resin depends on the viscosity desired, which in turn, relates to the method of application. For spraying, preferably the coating composition contains between about 10% and 30% by weight polymeric solids relative to 70% to 90% water including other volatiles such as minor amounts of solvent. For applications other than spraying, the aqueous polymeric dispersions can contain between about 10% and 40% by weight water. Organic solvents can be utilized to faciliate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein. Upon heat curing, the epoxy-acrylic copolymer as well as the epoxy phosphate and/or the aminoplast cross-linking resin.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade unless otherwise expressly noted.

EXAMPLE 1

(A) Preparation of Epoxy-Acrylic Copolymer

An epoxy-acrylic graft copolymer was prepared according to the following procedure: 2.31 pound of epoxy resin (DER-333) were heated in an agitated reactor to about 82°; 1.17 pounds of bisphenol-A were added with agitation. The reactor then was heated to about 191° over a period of about 2 hours and held there for an additional 2 hours. Periodic testing for viscosity and percent oxirane was made. Target oxirane value was about 0.6% and viscosity at 25° C. between Z and $Z_1$ (Gardner-Holt). When these values were obtained, 1.35 pounds of 2-butoxy-ethanol-1 were added, followed by 2.03 pounds of N-butanol. The molecular weight of the epoxy resin at this point was about 5,500 based on oxirane content. In a separate vessel, there was loaded and mixed the following: 0.64 pounds of methacrylic acid, 0.4 pounds of styrene, 0.44 pounds of ethyl acrylate, and 0.1 pounds of benzoyl peroxide. This monomer mixture was added gradually to the reactor containing the epoxy resin over a period of 2 hours at uniform rate. The reaction temperature was maintained at 118°. Viscosity was checked periodically on samples. The batch was cooled to 85°; its Acid Number on solids was 85.

The resin batch then was fed into an agitated reducing vessel containing a mixture of 10.95 pounds of deionized water (resistivity at least 50,000 ohm-cm) and 0.57 pounds of dimethylethanolamine. The temperature of the resulting blend was 50°. It was held there for about an hour, then the blend was cooled to below 32° by adding 5 pounds of the cool deionized water.

(B) The Effect of Variation in Composition

In the above example, the amount of benzoyl peroxide employed during the reaction was about 6.8% by weight based upon the monomer mixture. To demonstrate the effect of changes in composition with respect to proportions of the epoxy resin and the several monomers in the monomer mixture, several variations were made in Table 1 below.

TABLE 1

| Visc.[1] | Epoxy Resin | MAA[2] | ST[3] | EA[4] | Acid Number |
|---|---|---|---|---|---|
| U | 70 | 13 | 8 | 9 | 85 |
| Z-Z$_1$ | 30 | 13 | 34 | 23 | 85 |
| Z-Z$_1$ | 70 | 13 | 7.7 | 0.3 | 85 |
| Z-Z$_1$ | 80 | 13 | 6.8 | 0.2 | 85 |
| Z | 50 | 32.5 | 17.0 | 0.5 | 210 |
| Y | 60 | 25.75 | 13.85 | 0.4 | 168 |
| Z$_5$ | 80 | 13 | 6.8 | 0.2 | 85 |

[1]Viscosity of epoxy resin at 40% NV in 2-butoxy ethanol
[2]MAA = Methacrylic Acid
[3]ST = Styrene
[4]EA = Ethyl Acrylate

EXAMPLE 2

Epoxy Phosphate Synthesis

Procedure A

The epoxy phosphate was prepared according to the following procedure: 1005 gms. of epoxy resin (DER-333) and 340.5 gms. of bisphenol-A and 178 gms. of butyl cellosolve were heated to 140° C. in a 5 L round bottom flask equipped with stirrer, condenser and thermometer. When the temperature was at 140° C., the heat was turned off and the exotherm raised the temperature to 188° C. After the exotherm was peak, the batch was kept at 175° C. for an additional 5 hours. Periodic testing for viscosity and percent oxirane was made. Target oxirane value was about 2.28% and viscosity at 40% non-volatile between I-J. When these values were obtained, 227 gms. of butyl cellosolve were added, and the batch was cooled to 120° C. When the batch temperature was at 120° C., a mixture of 63.64 gms. of 85% phosphoric acid and 20 gms. of butyl cellosolve was added dropwise. The exotherm raised the batch temperature to 145° C. The batch was cooled to 120° C. and held for a half hour. Twenty-seven gms. of water were added to the reaction mixture and the batch was held at 120° C. for an additional 4 hours. After the hold, 241 gms. of butanol, 78 gms. of butyl cellosolve, 122.5 gms. of dimethylethanolamine and 2,500 gms. of deionized water were added respectively. The final mixture was agitated for 2 hours to obtain a stable emulsion.

Procedure B

Epoxy phosphate was produced by adding 816 gms. of epoxy resin (DER-333), 384 gms. of bisphenol-A, and 163 gms. of butyl cellosolve in a 5 L round bottom flask equipped with a stirrer, condenser, and thermometer and heated to 140° C. When the temperature was at 140° C., the heat was turned off and the exotherm raised the temperature to 155° C. After the exotherm was peak, the heat was turned back on to keep the temperature at 175° C. for an additional 2 hours. Periodic testing for viscosity and percent oxirane were made. Oxirane value was about 0.87% and the viscosity was X-Y at 40% NV in butyl cellosolve. When these values were obtained, 163 grams of butyl cellosolve were added, and the batch was cooled to 125° C. Mixture of 14.2 gms. of polyphosphoric acid (FMC) and 50 gms. of butyl cellosolve was added over 45 minutes, 30 gms. of extra butyl cellosolve was added as line rinse. The batch was held at 120° C. for 1 hour. Then 23 gms. of DI water were added to the reaction mixture and the held batch was at 120° C. for an additional 2 hours. After the hold time, the heat was turned off and 203 gms. of butanol were added over 8 minutes. 1550 gms. of DI water and 17.4 gms. of di-methyl ethanolamine were heated in a letdown container to 60° C. The above resin was dropped slowly into water amine mixture to form a stable emulsion. The resulting emulsion was adjusted to 25% NV by adding 1000 grams of DI water and stirring continued for 2 hours to insure an homogeneous mixture.

In accordance with the Procedure A or B, various epoxy phosphates were produced with the following molecular weight variation.

TABLE 2

| Molecular Weight | % Oxirane | % Acid | % NV | Emulsion |
| --- | --- | --- | --- | --- |
| 9410 | 0.34 | 0.35 | 30.3 | Good |
| 6150 | 0.52 | 0.39 | 34.4 | Good |
| 4000 | 0.80 | 0.92 | 34.9 | Good |
| 3080 | 1.04 | 0.92 | 32.8 | Good |
| 2500 | 1.26 | 2.30 | 23.0 | Good |
| 1400 | 2.28 | 4.20 | 22.4 | Good |

EXAMPLE 3

An aqueous blend of epoxy acrylic copolymer and epoxy phosphate was prepared as follows. 142 grams of epoxy phosphate emulsion (Ex. 2) was blended with 260 grams of epoxy-acrylic copolymer (Ex. 1A) emulsion along with 10 grams of Cymel 303 melamine. The coating was spray applied onto steel can and baked for one minute at 375° C. The can was filled with soft drink in a pack test which resulted in excellent corrosion resistance and substantially improved over a comparable pack test where epoxy-acrylic copolymer (Ex. 1A) was utilized alone.

The foregoing descriptions and illustrative examples set forth preferred embodiments and variations of the invention but are not intended to be limiting except by the appended claims.

I claim:

1. A water-dispersed coating composition comprising a polymeric mixture comprising on a polymer solids weight basis:

between 20% and 80% epoxy-acrylic copolymer wherein said epoxy-acrylic copolymer is an epoxy-acrylic graft copolymer prepared by in-situ polymerization of ethylenically unsaturated monomers in the presence of epoxy or an epoxy-acrylic ester graft copolymer produced by esterifying carboxy functional polymer with an epoxy resin in the presence of amine catalyst; and between 20% and 80% epoxy phosphate ester containing between 0.05% and 5% by weight of co-reacted phosphoric acid.

2. The composition in accordance with claim 1 wherein the epoxy-acrylic copolymer comprises a mixture of epoxy resin, epoxy-acrylic graft copolymer, and ungrafted addition polymer produced by in-situ polymerization of ethylenically unsaturated monomers including carboxyl monomer copolymerized in the presence of at least 3% by peroxide catalyst based on the weight of monomer and in the presence of epoxy resin.

3. The composition in accordance with claim 1 wherein the epoxy-acrylic copolymer comprises a preformed acrylic copolymer having carboxyl functionality esterified with epoxy resin.

4. The composition in accordance with claim 1 wherein the epoxy-acrylic copolymer comprises a preformed acrylic copolymer containing at least 20% copolymerized carboxyl monomer wherein said preformed acrylic copolymer was esterified with epoxy resin in the presence of at least 2% amine.

5. The composition in accordance with claim 1 wherein the epoxy phosphate portion of the epoxy-acrylic copolymer was derived from an epoxy resin having a molecular weight between 200 and 10,000.

6. The composition in accordance with claim 1 wherein the polymeric mixture comprises by weight between 35% and 64% epoxy-acrylic copolymer and between 35% and 65% epoxy phosphate ester.

7. The composition in accordance with claim 1 wherein the polymeric mixture contains between 1% and 10% aminoplast resin.

8. The composition in accordance with claim 1 wherein the epoxy phosphate contains between 0.1% and 3% by weight coreacted phosphoric acid.

* * * * *